US012593189B2

(12) United States Patent
Pei et al.

(10) Patent No.: US 12,593,189 B2
(45) Date of Patent: Mar. 31, 2026

(54) METHOD OF GENERATING VIBRATION FEEDBACK SIGNAL, ELECTRONIC DEVICE AND STORAGE MEDIUM

(71) Applicant: AAC Acoustic Technologies (Shanghai) Co., Ltd., Shanghai (CN)

(72) Inventors: Shiyu Pei, Shanghai (CN); Zengyou Meng, Shanghai (CN); Yajun Zheng, Shanghai (CN); Mengya Cao, Shanghai (CN)

(73) Assignee: AAC Acoustic Technologies (Shanghai) Co., Ltd., Shanghai (CN)

( * ) Notice: Subject to any disclaimer, the term of this patent is extended or adjusted under 35 U.S.C. 154(b) by 154 days.

(21) Appl. No.: 18/334,335

(22) Filed: Jun. 13, 2023

(65) Prior Publication Data

US 2024/0196147 A1 Jun. 13, 2024

Related U.S. Application Data

(63) Continuation of application No. PCT/CN2023/080095, filed on Mar. 7, 2023.

(30) Foreign Application Priority Data

Dec. 7, 2022 (CN) ........................ 202211564092.7

(51) Int. Cl.
*H04S 1/00* (2006.01)
*H04R 5/04* (2006.01)
*H04S 7/00* (2006.01)

(52) U.S. Cl.
CPC ............... *H04S 1/002* (2013.01); *H04R 5/04* (2013.01); *H04S 7/302* (2013.01)

(58) Field of Classification Search
None
See application file for complete search history.

(56) References Cited

U.S. PATENT DOCUMENTS

2021/0373670 A1* 12/2021 Shi ........................ G11B 27/02

FOREIGN PATENT DOCUMENTS

WO WO-2021196250 A1 * 10/2021 ............ G06F 3/016

OTHER PUBLICATIONS

English language translation of WO 2021/196250 A1, pp. 1-11. (Year: 2021).*

* cited by examiner

*Primary Examiner* — Paul W Huber
(74) *Attorney, Agent, or Firm* — Wiersch Law Group

(57) ABSTRACT

A method of generating a vibration feedback signal is provided and includes: generating an energy change trend curve (with a frame number as a horizontal axis and an energy change value as a vertical axis) of audio based on audio data; comparing an energy change value in the energy change trend curve with a preset energy change threshold; dividing the audio into audio segments based on a comparison result (indicating a tempo change trend of audio); matching a vibration feedback signal to the respective audio segment based on the tempo change trend; performing splicing process on all vibration feedback signals to obtain a target vibration feedback signal. The target vibration feedback signal obtained by splicing the vibration feedback signals finally matched to the audio segments conforms to the overall tempo change trend of the audio, thus effectively improving the rationality on matching between the audio and the vibration feedback signal.

9 Claims, 9 Drawing Sheets

METHOD OF GENERATING VIBRATION FEEDBACK SIGNAL, ELECTRONIC DEVICE AND STORAGE MEDIUM

TECHNIC FIELD

The various embodiments described in this document relate in general to the field of haptic feedback technology, and more specifically to a method of generating a vibration feedback signal, an electronic device and a storage medium.

BACKGROUND

With the development of science and technology and the progress of the Times, vibration feedback is gradually applied to a consumer electronic device such as a cell phone, a tablet, a gamepad, a smart watch and the like. Application scenarios of the vibration feedback have evolved from a simple vibration prompt to combining with audio, game and video. For example, in the process of game play the vibration feedback can provide different vibration effects according to different trigger commands (such as click, long press and slide, etc.) input by a user, or in the process of audio playback the vibration feedback can provide vibration effects with different intensities as the audio plays. Thus, the vibration feedback can bring an immersive sensory experience to the user.

In the related technology, if it is desired to carry out vibration feedback of audio, it is required to generate a corresponding vibration feedback signal in advance, and the vibration feedback signal may eventually be fed into a vibration feedback device in an electronic device, so that the vibration feedback device can vibrate synchronously according to the vibration feedback signal in the process of audio playback to achieve a desired vibration effect. However, almost all the audio is based on the same set of vibration feedback signal to achieve vibration feedback, while the same set of vibration feedback signal is difficult to be reasonably matched to different types (mainly reflected in different tempos) of audio, which indicates that it is poor in the rationality on the match between the audio and the vibration feedback signal, resulting in that the existing vibration feedback cannot bring a refreshing sensory experience for the user with regard to different types of audio, while it also confirms the phenomenon that the corresponding vibration effect of the vibration feedback signal is too single and not high in richness.

Therefore, it is desired to improve the method of generating the above vibration feedback signal.

SUMMARY

Embodiments of the present disclosure are intended to provide a method of generating a vibration feedback signal, an electronic device and a storage medium, and to solve the problem of poor rationality on matching between audio and a vibration feedback signal in the related technology.

In some embodiments, a method of generating a target vibration feedback signal is provided and includes:

- generating an energy change trend curve of audio based on audio data; where the energy change trend curve has a horizontal axis of frame number and a vertical axis of energy change value;
- comparing an energy change value in the energy change trend curve with a preset energy change threshold and obtaining a comparison result;
- dividing the audio into a plurality of audio segments based on a the comparison result; where the comparison result indicates a tempo change trend corresponding to a respective audio segment of the plurality of audio segments;
- matching a vibration feedback signal to each of the plurality of audio segments based on the tempo change trend corresponding to the respective audio segment;
- performing a splicing process on all vibration feedback signals to obtain a the target vibration feedback signal.

In some embodiments, an electronic device is provided and includes a memory and at least one processor. The memory is configured to store at least one program and the at least one program, when executed by the at least one processor, causes the at least one processor to implement the method of generating the vibration feedback signal as described above.

In some embodiments, a computer readable storage medium is provided. The computer readable storage medium stores executable instructions, and the instructions, when executed, implement the method of generating the vibration feedback signal as described above.

From the above description, it is clear that, compared with related technologies, the beneficial effect of the present application is as follows.

First, an energy change trend curve of audio is generated based on audio data, and an energy change value in the energy change trend curve is compared with a preset energy change threshold. Then, the audio is divided into a plurality of audio segments based on a comparison result, and the comparison result indicates a tempo change trend corresponding to a respective audio segment of the plurality of audio segments. Finally, a vibration feedback signal is matched to the respective audio segment based on the tempo change trend corresponding to the respective audio segment, and a splicing process is performed on all vibration feedback signals to obtain a target vibration feedback signal. A vibration feedback device in an electronic device can vibrate synchronously according to the target vibration feedback signal in the process of audio playback to achieve a corresponding vibration effect. It can be seen that in the present disclosure, the comparison result between the energy change value in the energy change trend curve and the preset energy change threshold indicates the tempo change trend of the audio, and at the same time, the audio is divided into multiple audio segments according to the tempo change trend of the audio. For the audio segments with different tempo change trends, they finally match with different vibration feedback signals. That is, the vibration feedback signals finally matched have different vibration effects respectively, which means that the target vibration feedback signal obtained by splicing the vibration feedback signals finally matched to the audio segments conforms to the overall tempo change trend of the audio, thus effectively improving the rationality on matching between the audio and the vibration feedback signal. In addition, different types of audio have different tempo change trends, and for different types of audio, the corresponding target vibration feedback signals have different vibration effects on the premise that they are consistent with tempo change trends respectively, not only to enhance the richness of the vibration feedback signal, but also to be capable of bringing a refreshing sensory experience for the user for different types of audio.

BRIEF DESCRIPTION OF THE DRAWINGS

In order to illustrate the technical solutions in the related technologies or the embodiments of the present disclosure more clearly, the drawings used in the description of the related technologies or the embodiments will be briefly described below. It is apparent that the drawings in the following description are only some embodiments of the present disclosure, instead of all embodiments. For those skilled in the art, other drawings may also be obtained in accordance with the drawings without any inventive effort.

DETAILED DESCRIPTION OF THE EMBODIMENTS

In order to make the purpose, technical solutions and advantages of the present disclosure more obvious and understandable, the present disclosure will be clearly and completely described with reference to the embodiments and accompany drawings of the present disclosure. Herein, the same or similar symbols from the beginning to the end indicate the same or similar components or components having the same or similar functions. It should be understood that the embodiments of the present disclosure described below are used only to explain the present disclosure and are not intended to limit the present disclosure. That is, based on the embodiments of the present disclosure, all other embodiments obtained by person skilled in the art without making any creative efforts fall into the protection scope of the present disclosure. In addition, the technical features involved in the various embodiments of the present disclosure described below may be combined with each other as long as not constituting conflict.

Figure 1:
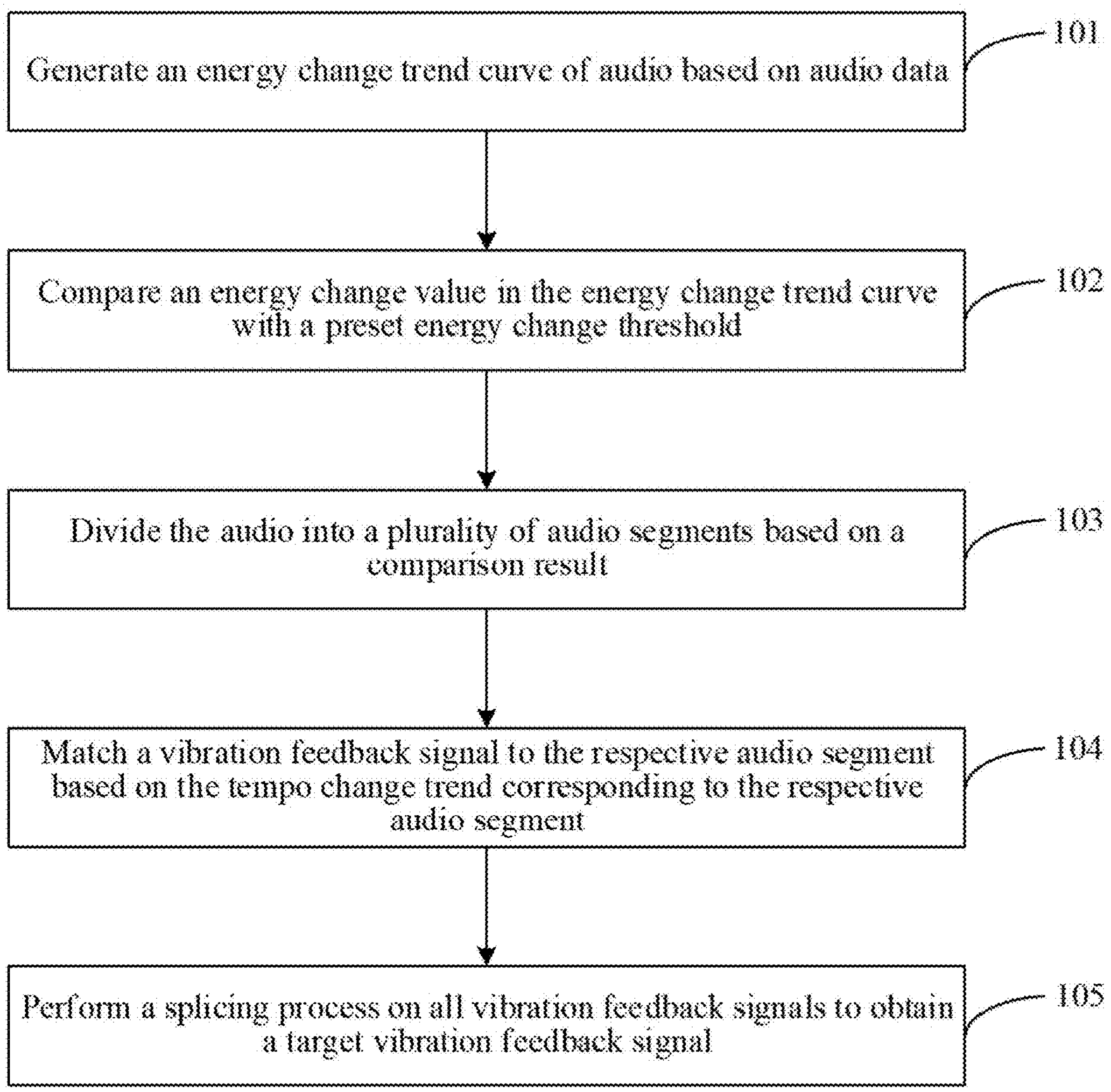
FIG. 1 is a flowchart of a method of generating a vibration feedback signal in accordance with some embodiments of the present disclosure.

With reference to FIG. 1, FIG. 1 is a flowchart of a method of generating a vibration feedback signal in accordance with some embodiments of the present disclosure. The method of generating the vibration feedback signal includes the following operations 101 to 105.

In 101, an energy change trend curve of audio based on audio data is generated.

Figure 2:
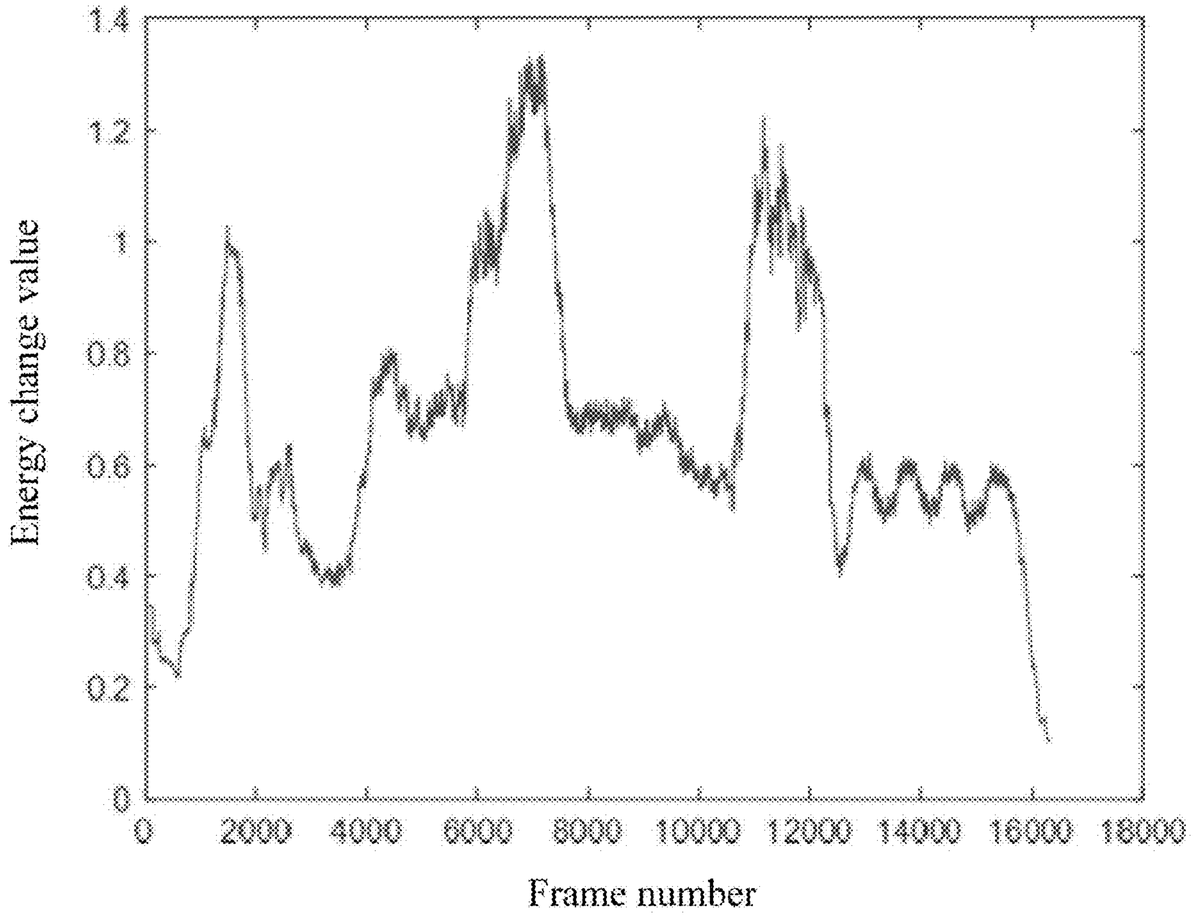
FIG. 2 is a schematic diagram of an energy change trend curve before correction in accordance with some embodiments of the present disclosure.

In the embodiments of the present disclosure, if it is desired to generate a vibration feedback signal in line with a tempo change trend of the audio, it is required to acquire the audio data of the audio, and to generate the energy change trend curve of the audio according to the audio data acquired. The energy change trend curve may be referred to FIG. 2, in which the horizontal axis represents a frame number and the vertical axis represents an energy change value. The energy change trend curve establishes a correspondence between the energy change value of the audio and the frame number, or the energy change trend curve characterizes the dynamic change of the energy of the audio with the number of frames. It should be noted that because a series of normalization operations (such as logarithmization, rectification, differencing, etc.) are performed on the audio data when carrying out a Mel spectrum energy analysis, the energy change trend curve directly generated may possibly have certain deviations. So it is required to correct the energy change trend curve, and FIG. 2 is only a schematic diagram of the energy change trend curve before correction. The specific correction process will be explained in detail in the following.

In 102, an energy change value in the energy change trend curve is compared with a preset energy change threshold.

In the embodiments of the present disclosure, after generating the energy change trend curve of the audio, it is also required to compare the energy change value in the energy change trend curve with the preset energy change threshold, i.e., to compare the size between the energy change value in the energy change trend curve and the preset energy change threshold, so as to subsequently partition the audio based on the comparison result.

In 103, the audio is divided into a plurality of audio segments based on a comparison result.

In the embodiments of the present disclosure, after comparing the energy change value in the energy change trend curve with the preset energy change threshold, it is also required to divide the audio into the plurality of audio segments according to the comparison result. At this time, the energy change trend curve may be divided into multiple interconnected regions according to the comparison result, and then the audio may be, with reference to the multiple interconnected regions, divided into multiple audio segments with continuous timing (i.e. one to one correspondence between the multiple interconnected regions and the multiple audio segments with continuous timing). It should be noted that the comparison result essentially characterizes the corresponding tempo change trend of each audio segment. Assuming that the energy change trend curve is divided into region A and region B according to the comparison result, and the comparison result includes that each energy change value in the region A is greater than or equal to the preset energy change threshold, and each energy change value in the region B is less than the preset energy change threshold, the audio may divided into audio segment a corresponding to the region A and audio segment b corresponding to the region B, and a tempo change of the audio segment a is obvious (i.e., fast tempo change) and a tempo change of the audio segment b is not obvious (i.e., slow tempo change). This means that the tempo change of the audio segment is obvious when the energy change value is greater than or equal to the preset energy change threshold, and the tempo change of the audio segment is not obvious when the energy change value is less than the preset energy change threshold.

In 104, a vibration feedback signal is matched to the respective audio segment based on the tempo change trend corresponding to the respective audio segment.

In the embodiments of the present disclosure, after the audio is divided into a plurality of audio segments with continuous timing based on the comparison result, it is required to match the corresponding vibration feedback signal for each audio segment according to the corresponding tempo change trend of each audio segment. Still following the example given in the operation 103, since the tempo change of the audio segment a is obvious, the vibration feedback signal with short interval and high frequency may be matched to the audio segment a. At the same time, since the tempo change of the audio segment b is not obvious, the vibration feedback signal with long interval and low frequency may be matched to the audio segment b. Alternatively, a signal library including a variety of vibration feedback signals may be pre-created, the vibration feedback signals in the signal library corresponds to different tempo change trends respectively. In this case, the corresponding vibration feedback signal is matched to each of the plurality of audio segments from the signal library according to the corresponding tempo change trend of the respective audio segment, without redesigning the vibration feedback signal in line with the respective tempo change trend for each audio segment.

In 105, a splicing process is performed on all vibration feedback signals to obtain a target vibration feedback signal.

In the embodiments of the present disclosure, although the audio is divided into the plurality of audio segments, the audio is continuous during playback, that is, there is no break between any two adjacent audio segments, which is the reason for the plurality of audio segments being continuous in timing. In light of this, after matching the corresponding vibration feedback signal to each audio segment according to the corresponding tempo change trend of each audio segment, the splice process is performed on all the vibration feedback signals to obtain a complete and continuous target vibration feedback signal. Then, the target vibration feedback signal may be input to the vibration feedback device in the electronic device, so that the vibration feedback device may vibrate synchronously in the process of audio playback according to the target vibration feedback signal to achieve the corresponding vibration effect.

It should be understood that the number of the preset energy change threshold is not limited to one. When the number of the preset energy change thresholds is n (n is a positive integer greater than 1), n preset energy change thresholds may constitute n+1 threshold intervals. Assuming that the number of the preset energy change thresholds is three, that is, x, y and z, and x<y<z, four threshold intervals may be constituted, which are less than x, greater than or equal to x and less than y, greater than or equal to y and less than z, greater than or equal to z. In this case, the energy change trend curve may be divided into at least four interconnected regions according to the threshold intervals in which the energy change values in the energy change trend curve are located, and the energy change values in the four regions are in the four threshold intervals respectively. At this time, the audio may be divided into at least four audio segments with continuous timing, and the four audio segments divided have different tempo change trends respectively, and the vibration feedback signals finally matched are also different from each other, which means that the final target vibration feedback signal, which is formed by the splicing of these four different vibration feedback signals, is a combination of at least four vibration effects. In view of this, the more the number of the preset energy change thresholds, the more the number of divided audio segments, the more the types of vibration feedback signals matched for audio segments, and the richer the vibration effect of the target vibration feedback signal spliced together by all the vibration feedback signals.

It can be seen that in the embodiments of the present disclosure, the comparison result between the energy change value in the energy change trend curve and the preset energy change threshold indicates the tempo change trend of the audio, and at the same time, the audio is divided into multiple audio segments according to the tempo change trend of the audio. For the audio segments with different tempo change trends, they are finally matched with different vibration feedback signals. That is, the vibration feedback signals finally matched have different vibration effects respectively, which means that the target vibration feedback signal obtained by splicing the vibration feedback signals finally matched to the audio segments conforms to the overall tempo change trend of the audio, thus effectively improving the rationality on matching between the audio and the vibration feedback signal. In addition, different types of audio have different tempo change trends, and for different types of audio, the corresponding target vibration feedback signals have different vibration effects on the premise that they are consistent with tempo change trends respectively, not only to enhance the richness of the vibration feedback signal, but also to be capable of bringing a refreshing sensory experience for the user for different types of audio.

Figure 3:
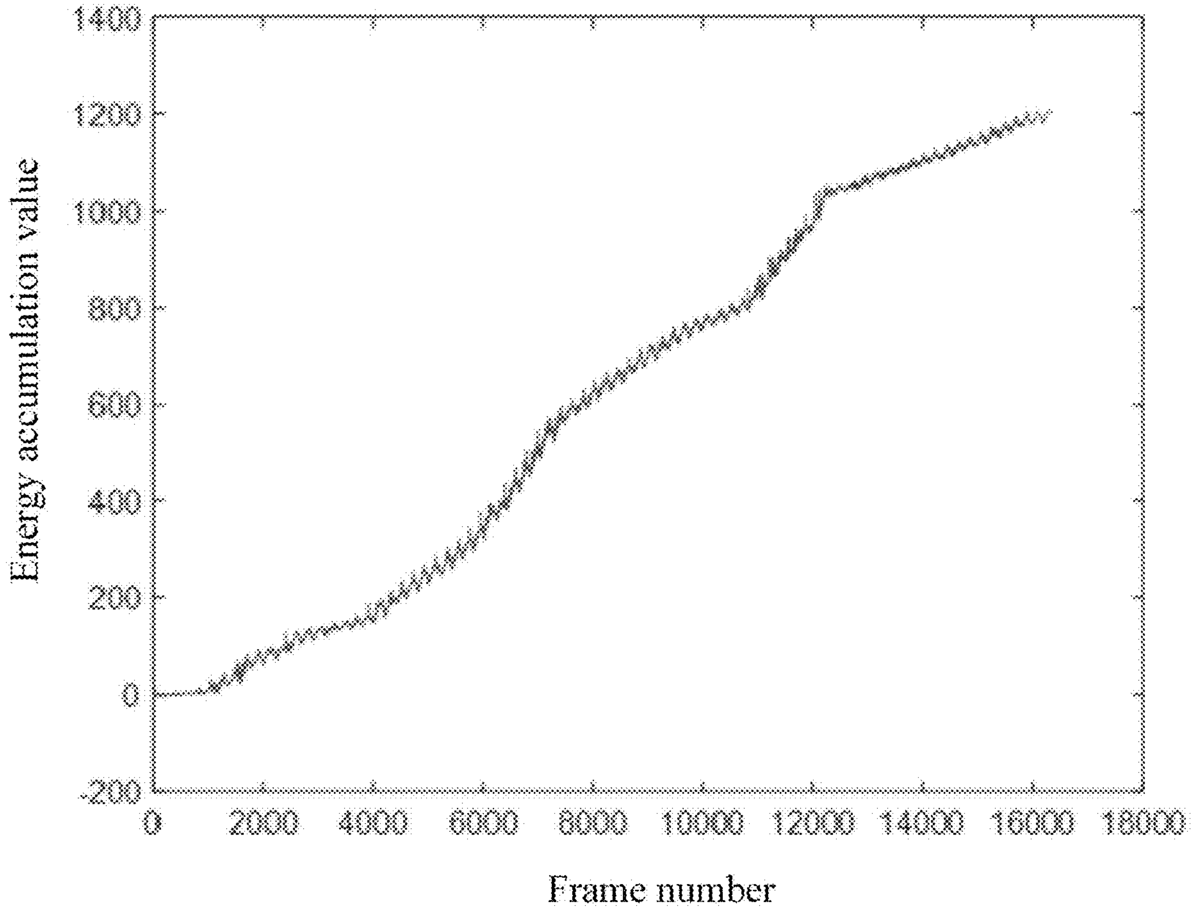
FIG. 3 is a schematic diagram of an energy accumulation curve in accordance with some embodiments of the present disclosure.

As an implementation, the operation 101 may include: generating an energy accumulation curve for the audio based on the audio data, and generating the energy change trend curve of the audio based on the energy accumulation curve. A schematic diagram of the energy accumulation curve in this implementation may be shown in FIG. 3, where the horizontal axis is the number of frame and the vertical axis is the energy accumulation value, which establishes the correspondence between the energy accumulation value of the audio and the number of frames, and which can well reflect the overall tempo change trend of the audio.

Figure 4:
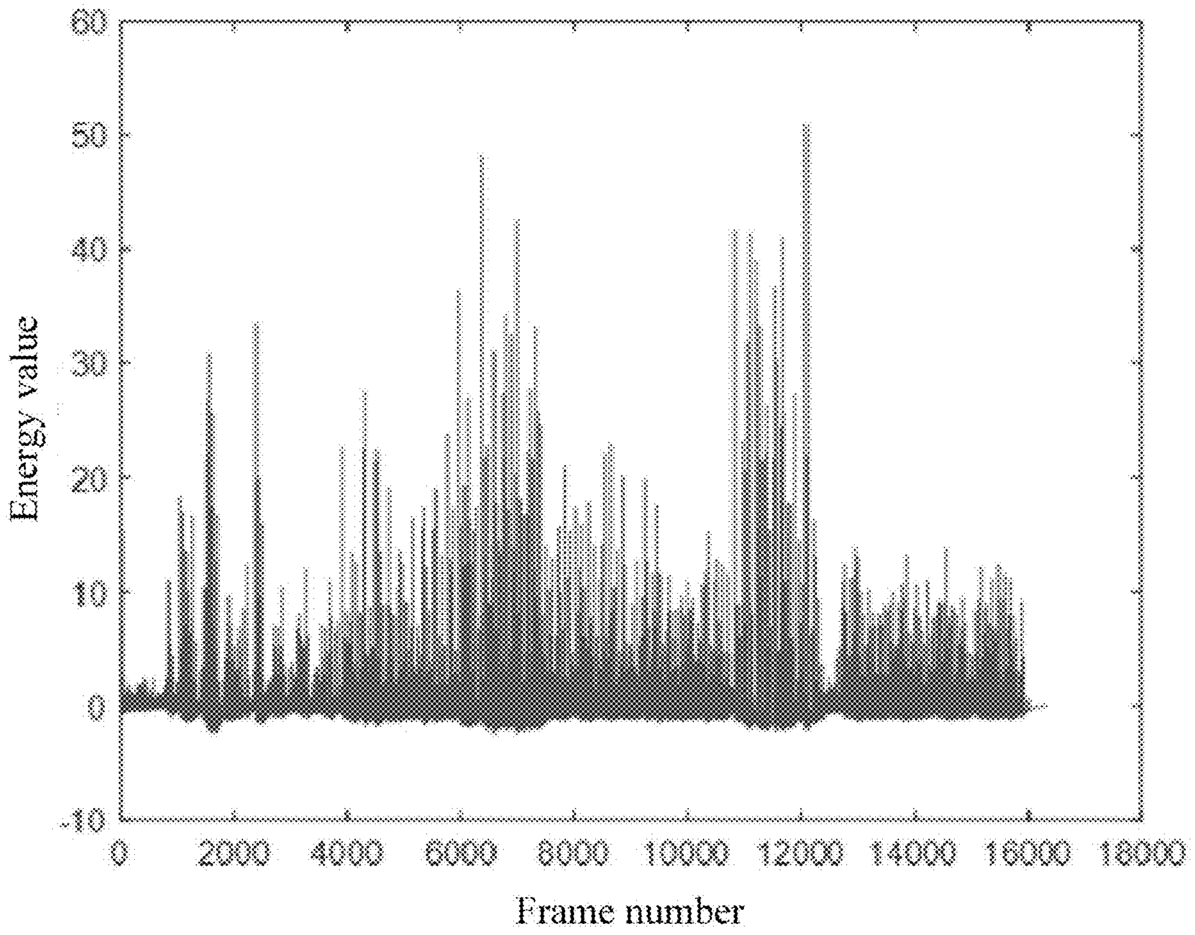
FIG. 4 is a schematic diagram of an energy curve in accordance with some embodiments of the present disclosure.

In one specific implementation, "generating the energy accumulation curve for the audio based on the audio data" may include: generating the energy accumulation curve for the audio based on a number of frames, duration, a number of beats per minute and an energy curve of the audio. The energy curve in this implementation may be illustrated in FIG. 4, where the horizontal axis is the number of frame and the vertical axis is the energy value, which establishes the correspondence between the energy value of the audio and the number of frames. Alternatively, the energy curve may be a Mel spectrum energy curve (with the number of frames as a horizontal axis and Mel spectrum energy value as a vertical axis), which is used to indicate an original spectrum energy of the audio data. It should be understood that each of the number of frames, duration, the number of beats per minute and the energy curve belongs to one kind of audio data. However, of course, in addition to those listed, other audio data commonly used in the field may also be included, such as the audio spectrum (with the number of frame as the horizontal axis or time as the horizontal axis) and the corresponding sampling rate, etc., which are not listed here in this specific implementation. In addition, in the process of inputting audio data, some data processing may be performed on the single/dual channels of audio, i.e., when the audio is input with two channels, the average value of the two-channel data may be read as the final input audio data.

Figure 5:
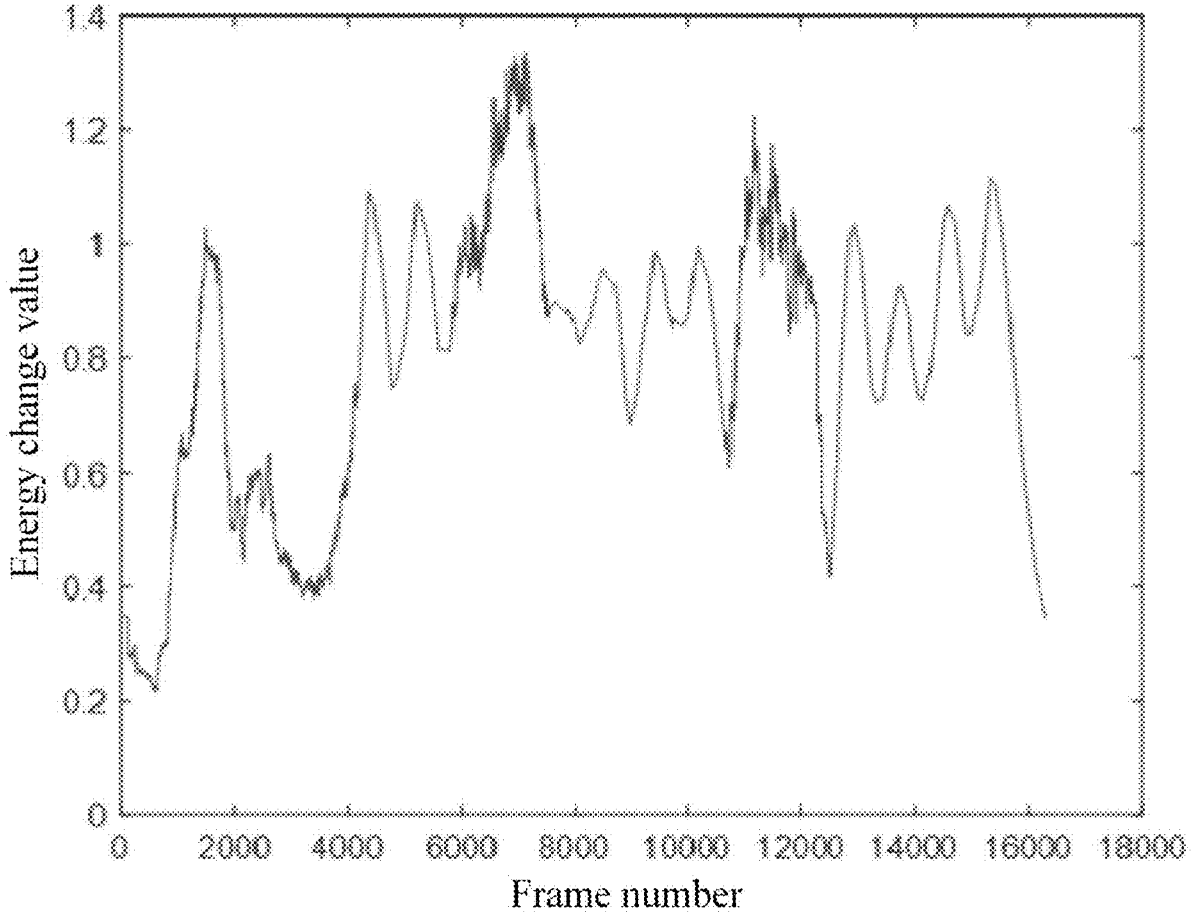
FIG. 5 is a schematic diagram of a corrected energy change trend curve in accordance with some embodiments of the present disclosure.
Figure 6:
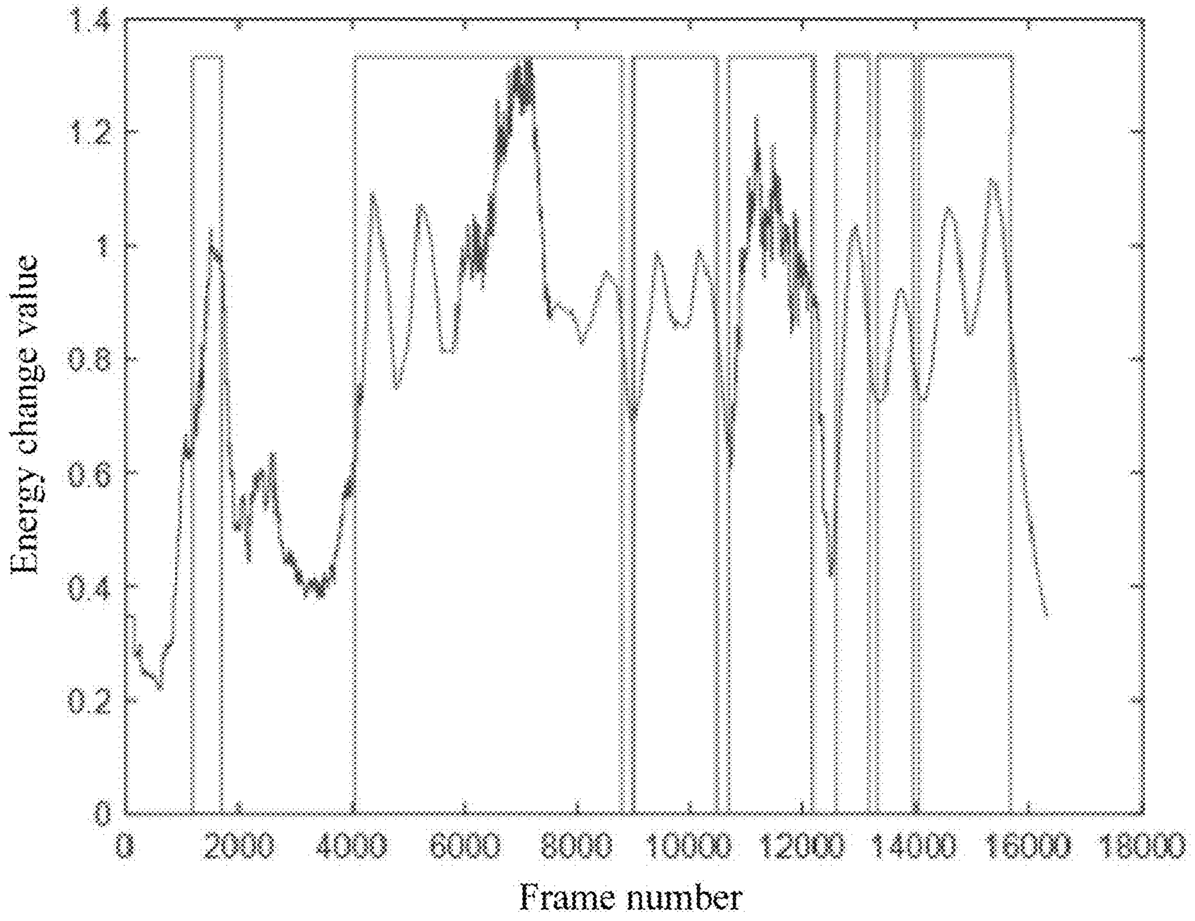
FIG. 6 is a schematic diagram of partitioning of audio segments in accordance with some embodiments of the present disclosure.

Furthermore, as mentioned above, because a series of normalization operations (such as logarithmization, rectification, differencing, etc.) are performed on the audio data for the Mel spectrum energy analysis, the energy change trend curve directly generated is likely to have certain deviations, so in an implementation, an energy envelope of the original spectrum energy of the audio data may be obtained and the energy change trend curve may be corrected according to the energy envelope. A schematic diagram of a corrected energy change trend curve may be shown in FIG. 5. It should be understood that the operations 102 and 103 are actually based on the corrected energy change trend curve. That is, the energy change value in the corrected energy change trend curve is compared with the preset energy change threshold, and the corrected energy change trend curve is divided into multiple interconnected regions based on the comparison result. Afterwards, the audio is divided into multiple audio segments with continuous timing with reference to the multiple interconnected regions. Herein, a schematic diagram of partitioning of the corrected energy change trend curve according to the comparison result may be shown in FIG. 6, where the energy change values in the regions included in the rectangular box in FIG. 6 are greater than or equal to the preset energy change threshold (correspondingly, the tempo change of the audio segments is obvious), and the energy change values in the regions not included in the rectangular box are less than the preset energy change threshold (correspondingly, the tempo change of the audio segments is not obvious).

Furthermore, after the energy change trend curve is corrected according to the energy envelope, the preset energy change threshold may be adjusted according to a largest energy change value in the corrected energy change trend curve. It should be understood that the preset energy change threshold is essentially a pre-set energy change value, and different types of audio have different preset energy change thresholds. There may be cases where the preset energy change threshold is much less than, much greater than, or approximately similar to the largest energy change value in the pre-correction/post-correction energy change trend curve, or there may be cases where the preset energy change threshold is a reasonable threshold in the pre-correction energy change trend curve but not a reasonable threshold in the corrected energy change trend curve. Thus, in this implementation, it is required to adjust the preset energy change threshold according to the largest energy change value in the corrected energy change trend curve so that it is a relatively reasonable value to facilitate successful partitioning of the audio.

As an implementation, when there is only one preset energy change threshold, the operation 103 may specifically include: dividing the audio into at least one first audio segment or at least one second audio segment based on the comparison result. Herein, the energy change value in the energy change trend curve of the first audio segment is greater than or equal to the preset energy change threshold, and the energy change value in the energy change trend curve of the second audio segment is less than the preset energy change threshold. The corresponding tempo change trend of the first audio segment is greater than that of the second audio segment. That is, the tempo change of the first audio segment is obvious and the tempo change of the second audio segment is not obvious.

In addition, as mentioned above, when there are n preset energy change thresholds, the n preset energy change thresholds may constitute n+1 threshold intervals. In this case, the energy change trend curve may be divided into at least n+1 interconnected regions according to the threshold interval in which the energy change value in the energy change trend curve is located, and thus the audio may be divided into at least n+1 audio segments with continuous timing, which will not be repeated in this implementation.

It should be noted that the above implementations are only as preferred implementations of the present disclosure, and not the only limitation on the correction of the energy change trend curve, the reasonable adjustment of the preset energy change threshold and the specific process of operations 101~105. In this regard, person skilled in the art may set flexibly according to the actual application scenario on the basis of the embodiments of the present disclosure.

In some embodiments, in order to simplify the process of matching the corresponding vibration feedback signal for each audio segment, some audio segments with relatively shorter duration may be cancelled, thereby reducing the time consumed in the process of matching the vibration feedback signal and reducing the complexity of matching.

As an implementation, "canceling the audio segments with relatively shorter duration" may include: merging an audio segment with duration less than or equal to a preset duration threshold into a previous audio segment; or, merging an audio segment with duration less than or equal to the preset duration threshold into a next audio segment.

As another implementation, "canceling the audio segments with relatively shorter duration" may include: dividing an audio segment with duration less than or equal to the preset duration threshold into two sub audio segments, and merging the two sub audio segments into a previous audio segment and a next audio segment respectively.

It should be noted that the above implementations are only preferred implementations of the present disclosure, and it is not the only limitation to the cancellation of the audio segment with relatively shorter duration. In this regard, person skilled in the art mat set flexibly according to the actual application scenario on the basis of the implementations of the present disclosure.

Figure 7:
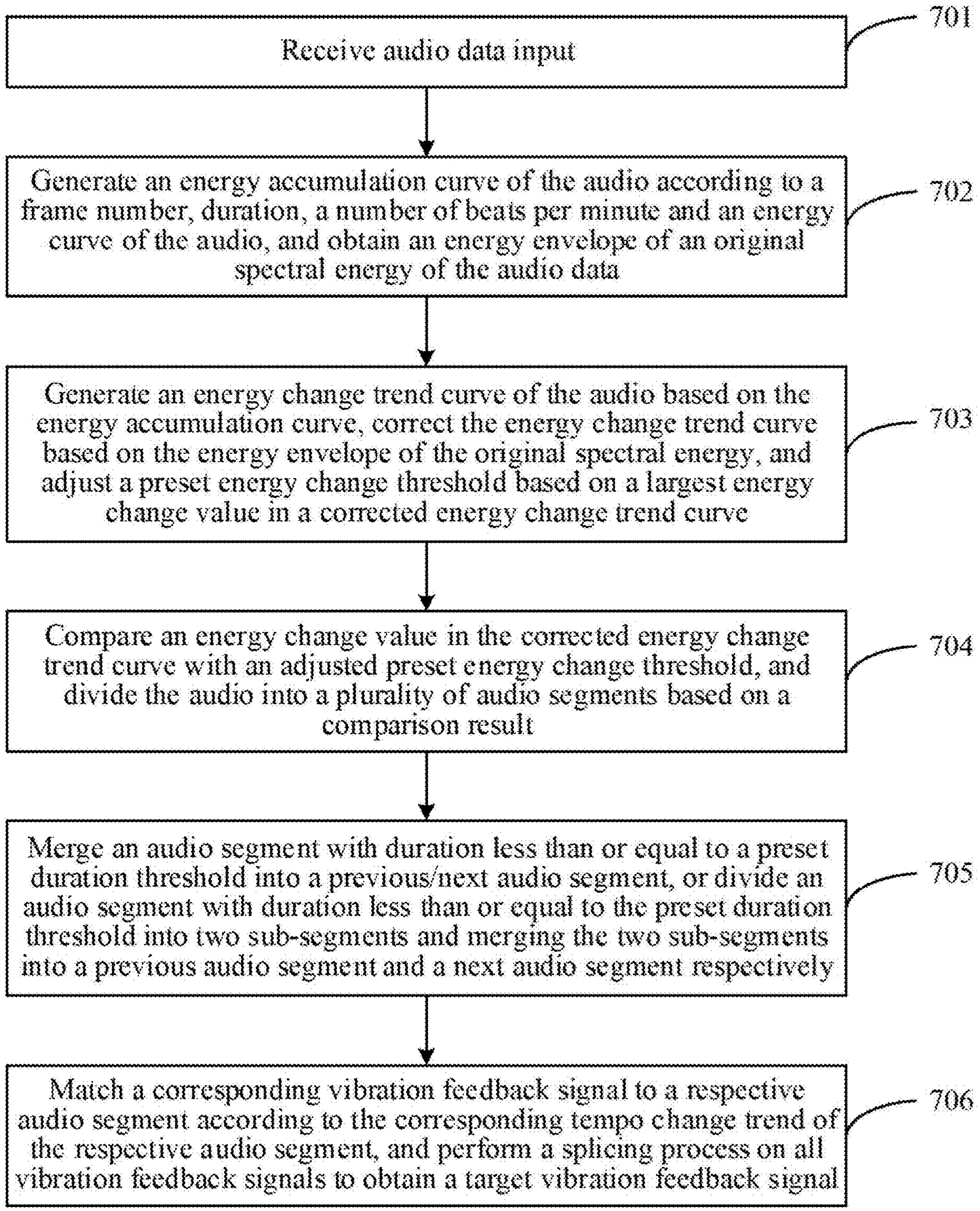
FIG. 7 is a flowchart from generating a vibration feedback signal to using the vibration feedback signal in accordance with some embodiments of the present disclosure.

In conclusion, the embodiments of the present disclosure relate to the generation and utilization of vibration feedback signal, and the process from generating a vibration feedback signal to using the vibration feedback signal may be referred to FIG. 7, including:

in 701, receiving audio data input;

in 702, generating an energy accumulation curve of the audio according to a frame number, duration, a number of beats per minute and an energy curve of the audio, and obtaining an energy envelope of an original spectral energy of the audio data;

in 703, generating an energy change trend curve of the audio based on the energy accumulation curve, and correcting the energy change trend curve based on the energy envelope of the original spectral energy, while adjusting a preset energy change threshold based on a largest energy change value in a corrected energy change trend curve;

in 704, comparing an energy change value in the corrected energy change trend curve with an adjusted preset energy change threshold, and dividing the audio into a plurality of audio segments based on a comparison result, which indicates a corresponding tempo change trend of a respective audio segment;

in 705, merging an audio segment with duration less than or equal to a preset duration threshold into a previous/next audio segment, or dividing an audio segment with duration less than or equal to the preset duration threshold into two sub-segments and merging the two sub-segments into a previous audio segment and a next audio segment respectively;

in 706, matching a corresponding vibration feedback signal to a respective audio segment according to the corresponding tempo change trend of the respective audio segment, and performing a splicing process on all vibration feedback signals to obtain a target vibration feedback signal; where the target vibration feedback signal is input to a vibration feedback device, so that the vibration feedback device in an electronic device can vibrate synchronously according to the target vibration feedback signal in the process of audio playback to achieve a corresponding vibration effect.

The more detailed process of the operations 701 to 706 can be found in the relevant part of the description shown above, and the embodiment of the present disclosure will not be repeated here.

Figure 8:
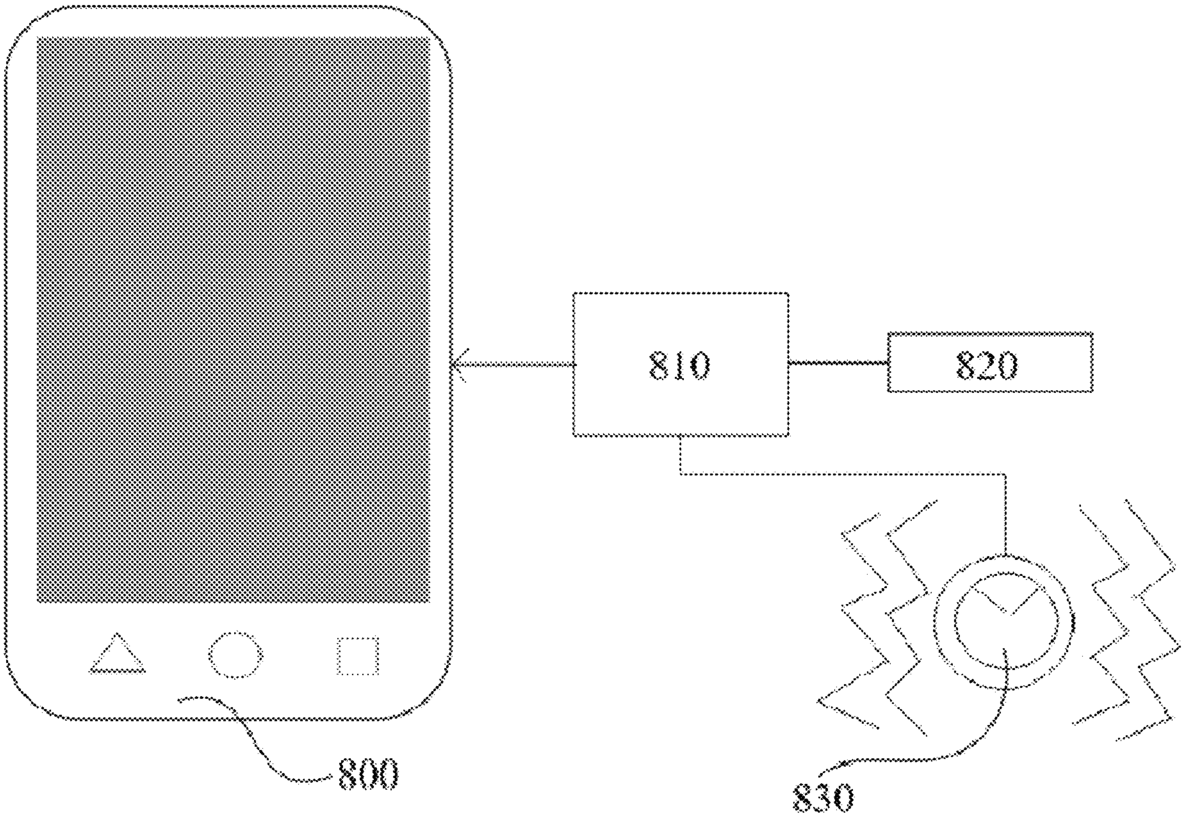
FIG. 8 is a schematic block diagram illustrating modules of an electronic device in accordance with some embodiments of the present disclosure.

Referring to FIG. 8, FIG. 8 is a schematic block diagram illustrating modules of an electronic device in accordance with some embodiments of the present disclosure.

As shown in FIG. 8, some embodiments of the present disclosure provide an electronic device 800, including a memory 820 and at least one processor 810. The memory 820 is configured to store at least one program and the at least one program, when executed by the at least one processor 810, causes the at least one processor 810 to implement the method of generating the vibration feedback signal as described in the above embodiments of the present disclosure.

The electronic device 800 further includes a vibration feedback device 830, which is configured to vibrate synchronously during audio playback in accordance with the target vibration feedback signal output by the processor 810 to achieve a corresponding vibration effect.

Figure 9:
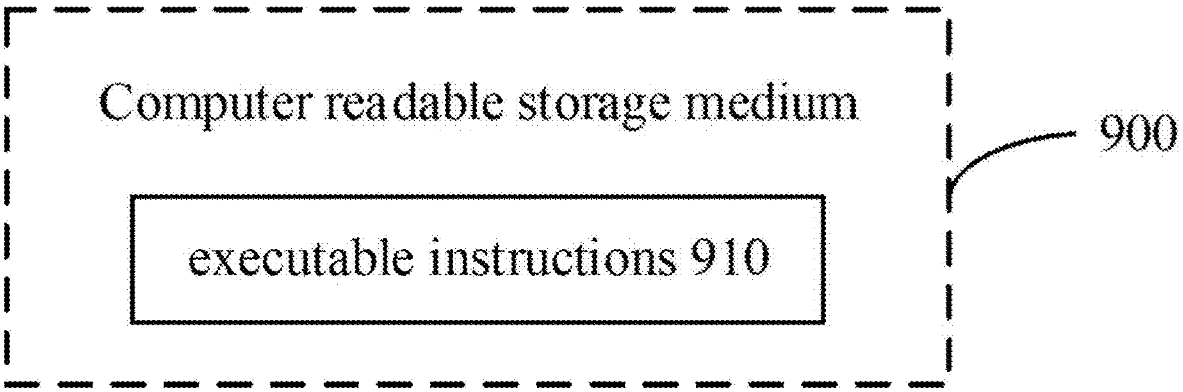
FIG. 9 is a schematic block diagram illustrating modules of a computer readable storage medium in accordance with some embodiments of the present disclosure.

Referring to FIG. 9, FIG. 9 is a schematic block diagram illustrating modules of a computer readable storage medium in accordance with some embodiments of the present disclosure.

As shown in FIG. 9, some embodiments of the present disclosure further provide a computer readable storage medium 900. The computer readable storage medium 900 stores executable instructions 910, and the instructions 910, when executed, implement the method of generating the vibration feedback signal as described in the above embodiments of the present disclosure.

The operations of the method or algorithm described in conjunction with the embodiments disclosed herein may be implemented directly with hardware, a software module executed by a processor, or a combination of the two. The software module may be arranged in random memory (RAM), memory, read-only memory (ROM), electrically programmable ROM, electrically erasable programmable ROM, registers, hard disk, removable disk, CD-ROM, or any other form of storage medium known in the art.

In the above embodiments, implementation may be in whole or in part by software, hardware, firmware, or any combination thereof. When implemented using software, it may be implemented in whole or in part in the form of a computer program product. The computer program product includes one or more computer instructions. When loading and executing the computer program instructions on a computer, a process or function may be, in whole or in part, implemented in accordance with the present disclosure. The computer may be a general purpose computer, a dedicated computer, a computer network, or other programmable device. The computer instructions may be stored in a computer-readable storage medium or transmitted from one computer-readable storage medium to another computer-readable storage medium, for example, the computer instructions may be transmitted from one website, computer, server, or data center to another website, computer, server, or data center by wired (e.g., coaxial cable, fiber optic, digital subscriber line) or wireless (e.g., infrared, wireless, microwave, etc.). The computer readable storage medium may be any available media that a computer can access or a data storage device such as a server, data center, etc. that contains one or more available media integrated. The available media may be magnetic media, (e.g., floppy disk, hard disk, magnetic tape), optical media (e.g., DVD), or semiconductor media (e.g., Solid State Disk), etc.

It should be noted that the embodiments in the present disclosure are described in a progressive manner, with each embodiment focusing on what is different from the other embodiments, and the same and similar parts between the various embodiments may be cross-referenced. For the product embodiment, the description is relatively simple because it is similar to the method embodiments, and the relevant parts may be found in the method embodiments.

It should also be noted that in the context of the present disclosure, relationship terms such as first and second are used only to distinguish one entity or operation from another, and do not necessarily require or imply any such actual relationship or order between those entities or operations. Further, the terms "includes," "comprises," or any other variation thereof are intended to cover non-exclusive inclusion, such that a process, a method, an article, or an apparatus that includes a set of elements includes not only those elements, but also other elements not expressly listed, or that also includes a process, a method, an article, or an apparatus that is intended to be used for the purpose of the process, the method, the article, or the apparatus. elements, or elements that are inherent to such a process, method, article, or apparatus. Without further limitation, the elements defined by the statement "including a . . . " do not preclude the existence of additional identical elements in the process, the method, the article, or the apparatus that include the elements.

The foregoing description of the disclosed embodiments enables those of skill in the art to implement or use the contents of the disclosure. A variety of modifications to these embodiments will be apparent to those skilled in the art, and the general principles defined in the contents of the present disclosure can be implemented in other embodiments without departing from the spirit or scope of the contents of the present disclosure. Accordingly, the content of the present disclosure will not be limited to those embodiments shown in the present disclosure, but will be subject to the widest scope consistent with the principles and novel features disclosed in the present disclosure.

What is claimed is:

1. An electronic device comprising:

a memory and at least one processor; and a vibration feedback device;

wherein the memory is configured to store at least one program, causing when executed by the at least one processor, the at least one processor to implement a method of generating a target vibration feedback signal;

wherein the vibration feedback device is configured to vibrate synchronously during audio playback in response to the target vibration feedback signal generated by the at least one processor;

wherein the method of generating the target vibration feedback signal comprising:

generating an energy change trend curve of audio based on audio data; wherein the energy change trend curve has a horizontal axis of frame number and a vertical axis of energy change value;

comparing an energy change value in the energy change trend curve with a preset energy change threshold and obtaining a comparison result;

dividing the audio into a plurality of audio segments based on the comparison result; wherein the comparison result indicates a tempo change trend corresponding to a respective audio segment of the plurality of audio segments;

matching a vibration feedback signal to each of the plurality of audio segments based on the tempo change trend corresponding to the respective audio segment;

performing a splicing process on all the vibration feedback signals to obtain the target vibration feedback signal.

2. The electronic device according to claim 1, wherein generating the energy change trend curve of the audio based on the audio data comprises:

generating an energy accumulation curve of the audio based on the audio data; wherein the energy accumulation curve has a horizontal axis of frame number and a vertical axis of energy accumulation value; and generating the energy change trend curve of the audio based on the energy accumulation curve.

3. The electronic device according to claim 2, wherein generating the energy accumulation curve of the audio based on the audio data comprises:

generating the energy accumulation curve of the audio based on a number of frames, duration, a number of beats per minute and an energy curve of the audio; wherein the energy curve has a horizontal axis of frame number and a vertical axis of energy value.

4. The electronic device according to claim 3, wherein the energy curve is a Mel spectrum energy curve, with a number of frame as a horizontal axis and a Mel spectrum energy value as a vertical axis.

5. The electronic device according to claim 3, wherein generating the energy change trend curve of the audio based on the audio data further comprises:

obtaining an energy envelope of an original spectral energy of the audio data; and correcting the energy change trend curve based on the energy envelope.

6. The electronic device according to claim 5, wherein the method comprises:

adjusting the preset energy change threshold based on a largest energy change value in a corrected energy change trend curve after correcting the energy change trend curve based on the energy envelope.

7. The electronic device according to claim 1, wherein dividing the audio into the plurality of audio segments based on the comparison result comprises:

dividing the audio into at least one first audio segment and at least one second audio segment based on the comparison result; wherein a corresponding energy change value in the energy change trend curve of each of the at least one first audio segment is greater than or equal to the preset energy change threshold, a corresponding energy change value in the energy change trend curve of each of the at least one second audio segment is less than the preset energy change threshold, tempo change trends of the at least one first audio segment is greater than that of the at least one second audio segment.

8. The electronic device according to claim 1, wherein matching the vibration feedback signal to each of the plurality of audio segments based on the tempo change trend corresponding to the respective audio segment comprises:

matching a corresponding vibration feedback signal to the respective audio segment from a pre-created signal library based on the tempo change trend corresponding to the respective audio segment.

9. The electronic device according to claim 1, wherein the method further comprises:

prior to matching the vibration feedback signal to each of the plurality of audio segments based on the tempo change trend corresponding to the respective audio segment:

merging an audio segment with duration less than or equal to a preset duration threshold into a previous audio segment or a next audio segment; or, dividing an audio segment with duration less than or equal to the preset duration threshold into two sub-audio segments and merging the two sub-audio segments into the previous audio segment and the next audio segment respectively.

* * * * *